(12) United States Patent  (10) Patent No.: US 7,450,182 B2
Nakajima et al.  (45) Date of Patent: Nov. 11, 2008

(54) IMAGE DISPLAY APPARATUS AND PICTURE QUALITY CORRECTION

(75) Inventors: Mitsuo Nakajima, Yokohama (JP); Yoshiaki Mizuhashi, Yokohama (JP); Haruki Takata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 589 days.

(21) Appl. No.: 11/060,423

(22) Filed: Feb. 18, 2005

(65) Prior Publication Data

US 2006/0098743 A1   May 11, 2006

(30) Foreign Application Priority Data

Nov. 5, 2004   (JP)  ............... 2004-321451

(51) Int. Cl.
*H04N 7/12*   (2006.01)
(52) U.S. Cl. .................... 348/625; 375/240.27
(58) Field of Classification Search ............... 348/725, 348/726, 558, 606–608, 618, 625; 382/266, 382/268; 375/240.27, 240.26, 240.29
See application file for complete search history.

(56) References Cited

U.S. PATENT DOCUMENTS

| 6,023,300 A | * | 2/2000 | Han et al. | ............... | 375/240.16 |
| 6,055,018 A |   | 4/2000 | Swan |   |   |
| 6,141,385 A | * | 10/2000 | Yamaji | ............... | 375/240.27 |
| 6,175,596 B1 | * | 1/2001 | Kobayashi et al. | ..... | 375/240.27 |
| 6,452,973 B1 | * | 9/2002 | Hwang | ............... | 375/240.27 |
| 6,825,886 B2 | * | 11/2004 | Kobayashi et al. | ....... | 348/405.1 |
| 7,305,170 B2 | * | 12/2007 | Okada et al. | ............ | 386/68 |

FOREIGN PATENT DOCUMENTS

| EP | 0 859 518 | 8/1998 |
| JP | 7-135580 | 5/1995 |
| JP | 7-203442 | 8/1995 |
| JP | 9-149417 | 6/1997 |
| JP | 10-56646 | 2/1998 |
| JP | 11-177850 | 7/1999 |
| JP | 11-234511 | 8/1999 |
| JP | 2000-165742 | 6/2000 |
| JP | 2001-016481 | 1/2001 |
| JP | 2004-187036 | 7/2004 |
| JP | 2004-208036 | 7/2004 |
| WO | WO 03-088641 | 10/2003 |

* cited by examiner

*Primary Examiner*—Paulos M Natnael
(74) *Attorney, Agent, or Firm*—Antonelli, Terry, Stout & Kraus, LLP.

(57) ABSTRACT

An image display apparatus is provided for receiving a digital image signal and displaying it so that high-quality images can be displayed with the noise reduced not to be conspicuous and with the contour appropriately corrected. The image display apparatus includes an input unit to which the digital image signal is applied, an information detection/separation circuit which detects and separates frame encoding information and bit rate information from the digital image signal, a picture quality correcting unit which makes contour correction/noise reduction process on the digital image signal, and a control circuit. The control circuit controls the picture-quality correcting unit to make the above process by using the frame encoding information and bit rate information from the information detection/separation circuit.

8 Claims, 10 Drawing Sheets

| FRAME TYPE | AMOUNT OF NOISE REDUCTION | | |
|---|---|---|---|
|  | LOW BIT RATE | MIDIUM BIT RATE | HIGH BIT RATE |
| I PICTURE | 5 (LARGE) | 3 | 2 |
| B PICTURE | 4 | 2 | 1 |
| P PICTURE | 4 | 2 | 1 (SMALL) |

| FRAME TYPE | AMOUNT OF CONTOUR CORRECTION |
|---|---|
| I PICTURE | SMALL |
| B PICTURE | LARGE |
| P PICTURE | LARGE |

| FRAME TYPE | AMOUNT OF CONTOUR CORRECTION | | |
|---|---|---|---|
| | LOW BIT RATE | MIDIUM BIT RATE | HIGH BIT RATE |
| I PICTURE | 1 (SMALL) | 3 | 4 |
| B PICTURE | 2 | 4 | 5 |
| P PICTURE | 2 | 4 | 5 (LARGE) |

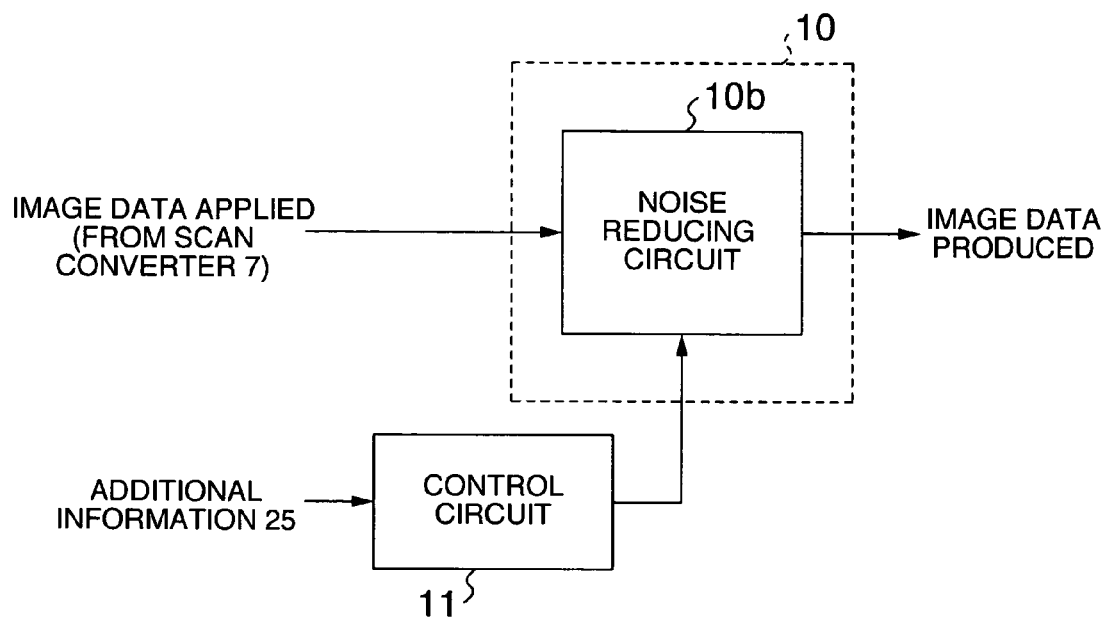

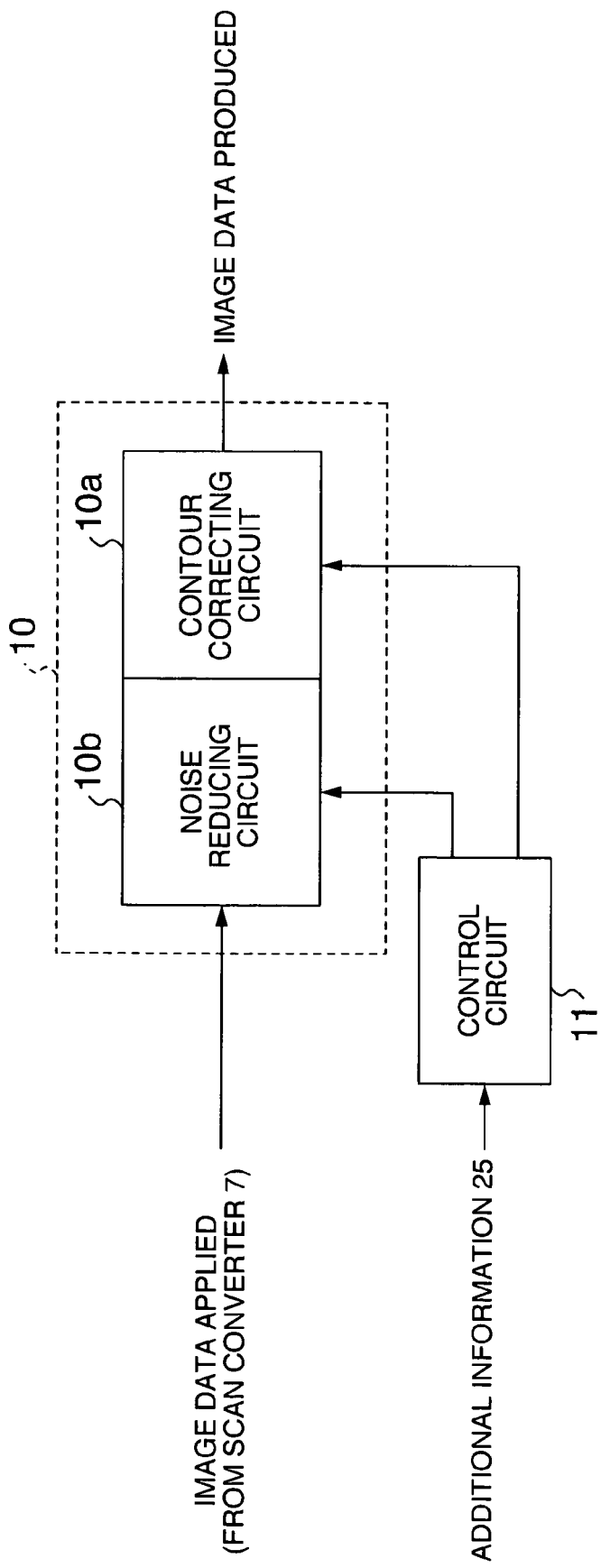

| FRAME TYPE | AMOUNT OF NOISE REDUCTION | | |
|---|---|---|---|
| | LOW BIT RATE | MIDIUM BIT RATE | HIGH BIT RATE |
| I PICTURE | 5 (LARGE) | 3 | 2 |
| B PICTURE | 4 | 2 | 1 |
| P PICTURE | 4 | 2 | 1 (SMALL) |

| FRAME TYPE | AMOUNT OF CONTOUR CORRECTION | | |
|---|---|---|---|
| | LOW BIT RATE | MIDIUM BIT RATE | HIGH BIT RATE |
| I PICTURE | 1 (SMALL) | 3 | 4 |
| B PICTURE | 2 | 4 | 5 |
| P PICTURE | 2 | 4 | 5 (LARGE) | ately DTV signal) is supplied through an antenna 20 and a first
IMAGE DISPLAY APPARATUS AND PICTURE QUALITY CORRECTION

INCORPORATION BY REFERENCE

The present application claims priority from Japanese application JP2004-321451 filed on Nov. 5, 2004, the content of which is hereby incorporated by reference into this application.

BACKGROUND OF THE INVENTION

1. Field of the Invention

The present invention relates to image display apparatus and digital television broadcast receiving apparatus, and particularly to an image display apparatus and digital television broadcast receiving apparatus in which the picture quality is corrected for by using additional information added to the inputted image signal.

2. Description of the Related Art

A digital image signal compressed to encode in an MPEG form has additional information added such as frame encoding information for each frame (information for I-picture, P-picture or B-picture), bit rate information and motion vector information.

A technique for reducing block noise and mosquito noise by using the frame encoding information of the above additional information is described in, for example, JP-A-10-56646 or JP-A-9-149417.

SUMMARY OF THE INVENTION

The prior arts described in JP-A-10-56646 and JP-A-9-149417 make only the process for reducing noise such as block noise and mosquito noise by using the additional information, and do not consider contour correction. In addition, the above prior arts use only the frame encoding information as the additional information to make picture quality correction such as noise reduction, and thus under this condition it is difficult to grasp correct state of pictures.

This invention provides a technique for making it possible to display higher-quality pictures when a digital image signal is applied and displayed.

Moreover, this invention is characterized by the detection of the additional information applied together with the digital image signal, and by the contour correction for the image signal by using the detected additional information. This additional information is, for example, the information about frame encoding added to each frame of the image signal (namely, information indicative of I-picture, P-picture and B-picture).

This invention is also characterized by the use of not only the frame encoding information but also bit rate information as the additional information used for the picture quality correction processes such as contour correction and noise reduction processes. In other words, this invention has another feature that, at least one of the contour correction and noise reduction is performed by using a combination of the detected frame encoding information and bit rate information.

Furthermore, this invention has still another feature that the frame encoding information and bit rate information produced when the stream of a received digital broadcast signal is decoded are used to perform the picture quality correction such as contour correction and noise reduction. According to this invention, high quality images can be displayed.

Other objects, features and advantages of the invention will become apparent from the following description of the embodiments of the invention taken in conjunction with the accompanying drawings.

BRIEF DESCRIPTION OF THE DRAWINGS

FIG. 5 is a block diagram showing the second embodiment according to the invention.

FIG. 6 is a diagram showing a table structure for determining the amount of noise reduction.

FIG. 7 is a diagram showing the third embodiment according to the invention.

DETAILED DESCRIPTION OF THE EMBODIMENTS

Preferred embodiments of the invention will be described with reference to the accompanying drawings.

Embodiment 1

Figure 1:
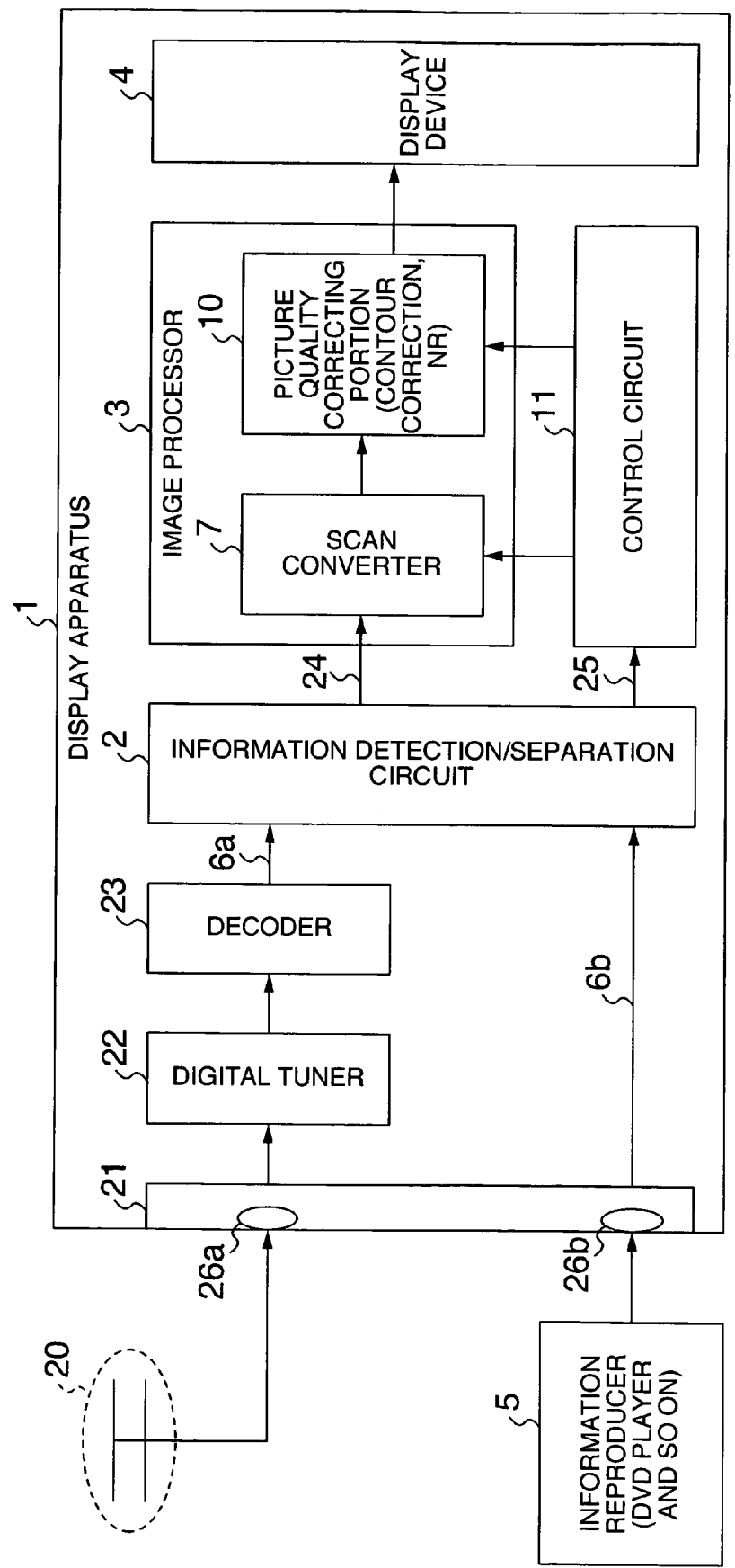
FIG. 1 is a block diagram showing the first embodiment of an image display apparatus according to this invention.

FIG. 1 is a block diagram of an embodiment of a display apparatus 1 according to the invention. The display apparatus 1 shown in FIG. 1 corresponds to an example of a receiver capable of receiving a digital television broadcast and displaying it. A selected digital television broadcast signal of a desired channel (such as a ground-based digital broadcast signal or BS/CS digital broadcast signal, hereinafter abbreviated DTV signal) is supplied through an antenna 20 and a first input terminal 26a provided within an input interface 21 to a digital tuner 22. Here, the DTV signal received by the digital tuner 22 is an MPEG stream including a digital image signal of, for example, MPEG type formed by compression encoding. This stream includes various types of additional information such as information about encoding a corresponding frame, or encoding information added for each frame of the image signal (hereinafter, called the frame encoding information), information of data rate of the stream (transfer rate), information of motion vector between frames, information of intra-frame macro block, and information of pull-down phase. The pull-down phase information will be later described in detail. The above frame encoding information includes I-pictures indicating that the corresponding frame is encoded within the current frame, or intra-frame encoded, P-pictures indicating that the frame is encoded by using the previous frame, and B-pictures indicating that the frame is encoded by using the previous and next frames.

The DTV signal received by the digital tuner 22 is demodulated by the digital tuner 22, and then expanded and decoded by a decoder 23. The decoded DTV signal is supplied to an information detection/separation circuit 2 as decoded data 6a containing digital image data and the above additional information.

The digital broadcast receiving/displaying apparatus of this embodiment is able to receive not only the DTV signal but also the digital image signal reproduced from certain recording media. An information reproducer 5 such as a DVD player reproduces and decodes an image signal from a DVD on which a digital image signal compressed to encode in an MPEG form is previously recorded. The decoded data from the information reproducer 5 includes the image data and the above additional information as does the DTV signal. The decoded data is supplied through an input terminal 26b of the input interface 21 to the information detection/separation circuit 2. The standard for the transmission of both this digital image data and the other information is, for example, HDMI specification. However, here the transmission standard is not particularly limited to this specification, but may be arbitrary as long as the digital image and the other information can be transmitted together.

The information detection/separation circuit 2 detects and extracts the above additional information from either one or both of the decoded data 6a and 6b so that the decoded data can be separated into image data 24 and additional information 25. In other words, the information detection/separation circuit 2 separates image data 24 and additional information 25 from the decoded data 6a and/or 6b and produces them at its output end. Although not shown, a switch circuit may be provided on the input side of the information detection/separation circuit 2. This switch circuit selects any one of these decoded data 6a and 6b in accordance with, for example, a command from the user, and then supplies it to the information detection/separation circuit 2.

The image data 24 fed from the information detection/separation circuit 2 is supplied to an image processor 3. The image processor 3 includes a scan converter 7 for converting the inputted image data 24 to a signal of the progressive scan type when it is of the interlace scan type (namely when the DTV signal or the decoded data 6b from the information reproducer is of the interlace scan type), and a picture quality correction circuit 10 for making certain picture quality correction for the output signal from the scan converter 7. The picture quality correction circuit 10 makes contour correction processing to correct for the contour of the image data, and noise reduction processing (NR) to reduce the noise of the image data. Although not shown, other processes such as contrast correction, color correction and gamma correction are performed. On the other hand, the additional information 25 produced from the information detection/separation circuit 2 is supplied to a control circuit 11. The control circuit 11, which is formed of, for example, a microcomputer, analyzes the additional information 25 fed, and supplies an appropriate control signal according to the type of this information to the image processor 3. If the additional information is, for example, motion vector information, macro block information or pull-down phase information, the control circuit 11 generates a first control signal for controlling the progressive scan processing and supplies it to the scan converter 7 of the image processor 3. If the additional information is frame encoding information or data rate information, the control circuit 11 generates a second control signal for controlling the amount of picture quality correction, and supplies it to the picture quality correction circuit 10 of the image processor 3.

The image data 24 fed to the image processor 3, when the image data is of the interlace scan form, is converted by the scan converter 7 to a progressive scan form on the basis of the first control signal from the control circuit 11. The output signal from the scan converter 7 is corrected for its contour and reduced in its noise by the picture quality correction circuit 10 under the control of the second control signal from the control circuit 11. The signal corrected for its picture quality in the picture quality correction circuit 10 is supplied to a display device 4. The display device 4 displays the image based on this signal. The display device 4 is, for example, a flat panel device such as a plasma display panel, liquid crystal panel or field emission display panel. It may be a micro mirror device or liquid crystal panel for projection type display.

The construction of the picture quality correction circuit 10 of the image processor 3, which is a characteristic portion of this embodiment, will be described with reference to FIGS. 2 through 4. The picture quality correction circuit 10 shown in FIG. 2 includes a contour correction circuit 10a for making contour correction for the image data produced from the scan converter 7. This contour correction circuit 10a extracts the contour components of the image by, for example, finding the second derivative of the image data or the difference between the adjacent pixels. The extracted contour components are amplified and added to the original image data, thereby correcting (emphasizing) the contour. Thus, the contour of the image looks clear, and thus the image becomes highly attractive. This processing or the construction for this processing is called the enhancer. In this embodiment, the control circuit 11 controls the degree that the above contour components are amplified (the amount of contour correction). In this embodiment, the additional information 25 separated by the information detection/separation circuit is supplied to the control circuit 11. This additional information is the frame encoding information that indicates which one of I-picture, B-picture and P-picture of MPEG corresponds to each field of the image data 24.

In this case, the I-picture has a characteristic to easily cause block noise and mosquito noise, and B-picture and P-picture have characteristics not to easily cause block noise and mosquito noise as compared with the I-picture. Therefore, if the amount of contour correction is increased for the I-picture, noise is apt to be highly visible. The control circuit 11 according to this embodiment has stored therein a table of the association between the frame encoding information type and the amount of contour correction as shown in FIG. 3, and controls the amount of contour correction according to this table. If information of I-picture is supplied to the control circuit 11 as the frame encoding information, the control circuit 11 selects the "SMALL" amount of contour correction by referring to the table of FIG. 3. Then, the control circuit 11 supplies the control signal of this amount of contour correction to the contour correction circuit 10a, thus controlling it to correct the contour by this amount. Therefore, when the I-picture frame is displayed, the block noise and mosquito noise can be made not to be conspicuous on the display device. In addition, when information of B-picture or P-picture is supplied as frame encoding information to the control circuit 11, the "LARGE" amount of contour correction is selected by referring to the table of FIG. 3. The control signal of this amount of contour correction is supplied to the contour correction circuit 10a, thus controlling the amount of contour correction in the contour correction circuit 10a. Since the B-picture or P-picture has relatively small block noise and mosquito noise, the noise is not noticeable even if the amount of contour correction is increased to emphasize the contour. While the amounts of contour correction are selected the same for the B-picture and P-picture in this embodiment, they may be different. When the amount of noise in P-picture is more than that in B-picture, the amount of contour correction for P-picture may be decreased as compared with that for B-picture.

In addition, the amount of contour correction may be controlled in consideration of not only the frame encoding information but also the bit rate information. An example of using a combination of the frame encoding information and the bit rate information to control the amount of contour correction will be described with reference to FIG. 4. The circuit arrangement of this example is assumed to be the same as shown in FIG. 2. FIG. 4 shows a table different from that of FIG. 3, or specifying the association among the types of frame encoding information, the bit rate information and the amounts of contour correction. This table is held in the control circuit 11 as is the table of FIG. 3.

In this case, the noise is increased with the decrease of bit rate, and decreased with the increase of bit rate. The relation between the noise and the picture of I-picture, P-picture and B-picture is as described above. Therefore, if the frame encoding information and bit rate information are respectively I-picture and low (lowest) bit rate that indicate that the most noise occurs (or noise tends to be highly visible), the amount of contour correction is the minimum (1) by referring to the table of FIG. 4. If the frame encoding information and bit rate information are respectively P-picture or B-picture and high (highest) bit rate that indicate that the least noise occurs (or noise tends not to be conspicuous), the amount of contour correction is the maximum (5) by referring to the table. In this embodiment, five different amounts of contour correction, or five stepwise amounts of 1~5 are used for the combinations of bit rate information and frame encoding information as listed on the table of FIG. 4. In other words, these amounts of contour correction are determined by supposing the amounts of noise caused according to the type of frame encoding information and the degree of bit rate.

Figures 2, 3, 4:
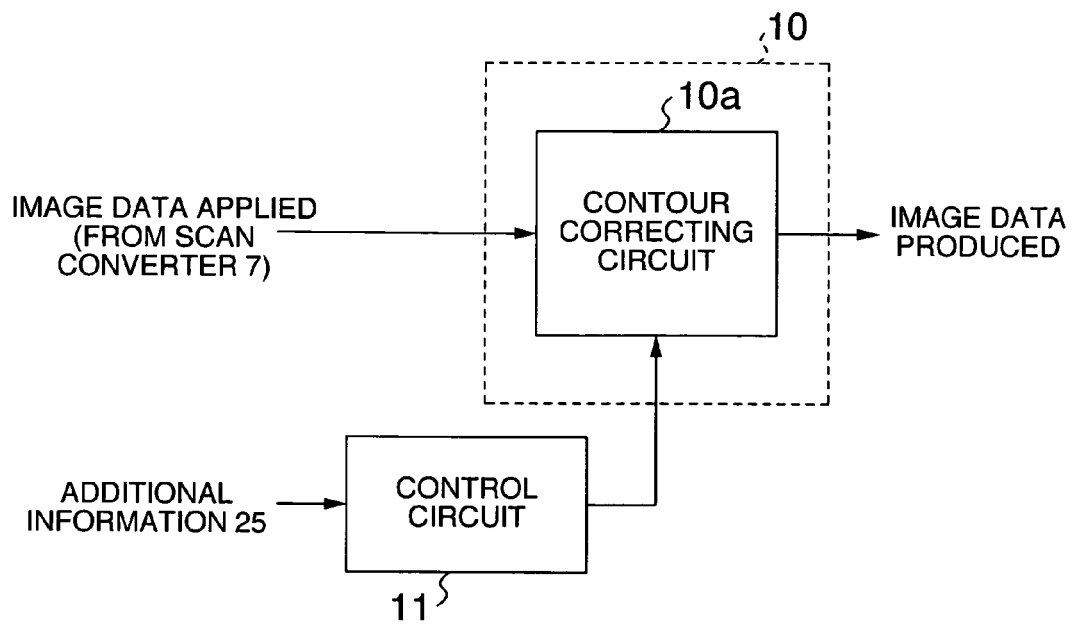
FIG. 2 is a block diagram showing an example of a picture quality correction circuit 10 in the first embodiment.
FIG. 3 is a diagram showing a table structure for determining the amount of contour correction.
FIG. 4 is a diagram showing another table structure for determining the amount of contour correction.

The control circuit 11 is supplied with the additional information 25 from the information detection/separation circuit 2, and selects the corresponding amounts of contour correction by using the frame encoding information and bit rate information contained within the additional information, and by referring to the table of FIG. 4. If the frame encoding information and bit rate information are respectively I-picture and medium bit rate, "3" amount of contour correction is selected. The control circuit 11 supplies the control signal of this amount of contour correction to the contour correction circuit 10a, thus controlling the amount of contour correction in the contour correction circuit 10a. Even if the additional information indicating other combinations is supplied, the same operation is made to correct for the contour.

Thus, according to this embodiment, the contour correction is performed on the basis of the frame encoding information, so that it is possible to make appropriate contour correction. In addition, since this embodiment makes the contour correction in accordance with the combination of the frame encoding information and bit rate information, more appropriate contour correction can be made on the basis of the type of frame encoding information and the degree of bit rate. While five amounts of contour correction are used in the example of FIG. 4, it is not limited to those amounts, but may be properly changed if necessary.

In addition, while the contour correction is made for each frame in this embodiment, it may be made for a unit of a certain time (for example, over a few frame periods to dozens of frame periods or above). For example, the ratios among the number of I-pictures, P-pictures and B-pictures within a certain time (for example, 10 frame periods to dozens of frame periods) are measured. If the ratio of I-pictures to the other pictures is larger as a result of the measurement, the contour correction is controlled to be weak over all the frames of that certain period (namely irrespective of I, P and B pictures). On the contrary, when the ratio of I-pictures is smaller, the contour correction is controlled to be strong. The value of noise appearance in the moving picture is determined as an average over these frames. Therefore, even if the ratio of particular frame encoding information is estimated over the certain period mentioned above, and used to control the contour correction, the same effect can be achieved. Moreover, the control using this ratio and the control for each frame mentioned above may be combined.

Embodiment 2

The second embodiment according to the invention will be described with reference to FIGS. 5 and 6. As illustrated in FIG. 5, the picture quality correction circuit 10 includes a noise reduction circuit 10b for reducing the noise of the image data produced from the scan converter 7. This noise reduction circuit 10b has, for example, a low-pass filter or a core ring portion for suppressing an output signal of very small amplitude to substantially zero so that the amount of noise reduction can be controlled by properly changing the coefficients of the low-pass filter or the amount of core ring of the core ring portion. In this embodiment, the control circuit 11 using the frame encoding information and bit rate information controls this amount of noise reduction. The control circuit 11 is supplied with the additional information 25 separated by the information detection/separation circuit 2. This additional information contains the above-mentioned frame encoding information and bit rate information.

As described above, the I-picture has a characteristic of easily causing block noise and mosquito noise while the B-picture and P-picture have characteristics of not easily causing block noise and mosquito noise as compared with the I-picture. In addition, the noise is increased with the decrease of the bit rate, and decreased with the increase of the bit rate. Considering these characteristics of the picture types and bit rate to the noise, the control circuit 11 according to this embodiment has a table that specifies the association among the type of frame encoding information, the degree of bit rate information and the amount of noise reduction as shown in FIG. 6. If the frame encoding information and bit rate information are respectively I-picture and low (lowest) bit rate that indicate that the most noise occurs (or noise is easy to be conspicuous), the amount of noise reduction is the maximum (5) by referring to this table. If the frame encoding information and bit rate information are respectively P- or B-picture and high (highest) bit rate that indicate that the least noise occurs (or noise is not easy to be conspicuous), the amount of noise reduction is the smallest (1) by referring to the table. In other words, the resulting control characteristic is opposite to that resulting from the contour correction processing mentioned in the first embodiment. In this embodiment, five stepwise amounts of noise reduction, or five steps of 1~5 are used on the basis of the combination of the bit rate information and frame encoding information as will be seen from the table of FIG. 6. That is, these amounts of noise reduction are determined by supposing the extent of noise according to the type of frame encoding information and the degree of bit rate.

The control circuit 11 selects the corresponding amount of noise reduction by using the frame encoding information and bit rate information contained in the inputted additional information 25 by referring to the table of FIG. 6. If the frame encoding information and the bit rate information are respectively I-picture and medium bit rate, "3" amount of noise reduction is selected. Then, the control circuit 11 supplies the control signal of this amount of noise reduction to the noise reduction circuit 10b, thus controlling the amount of noise reduction in the noise reduction circuit 10b. Even if the additional information of other combinations is supplied, the noise reduction processing is made by the same operation.

Thus, according to this embodiment, the noise reduction processing is performed on the basis of the combination of the frame encoding information and bit rate information, and thus appropriate noise reduction processing can be made in accordance with the type of frame encoding information and the degree of bit rate. While five stepwise amounts of noise reduction are used in the example of FIG. 6, the amount of noise reduction is not limited to those values, but may be arbitrary values if necessary.

Embodiment 3

The third embodiment of the invention will be described with reference to FIGS. 7 and 8. The third embodiment is the combination of the first and second embodiments. In other words, this embodiment makes the contour correction and noise reduction by using the frame encoding information and bit rate information. Referring to FIG. 7, the picture quality correction circuit 10 includes the noise reduction circuit 10b for making the noise reduction processing on the image data produced from the scan converter 7, and the contour correction circuit 10a for making the contour correction processing on the output data produced from the noise reduction circuit 10b. The detailed constructions of the contour correction circuit 10a and noise reduction circuit 10b have been described above, and thus will not be mentioned here. In addition, the extent of noise depending upon the type of frame encoding information and the degree of bit rate is as described above, and thus will not be described here.

Figures 8, 9:
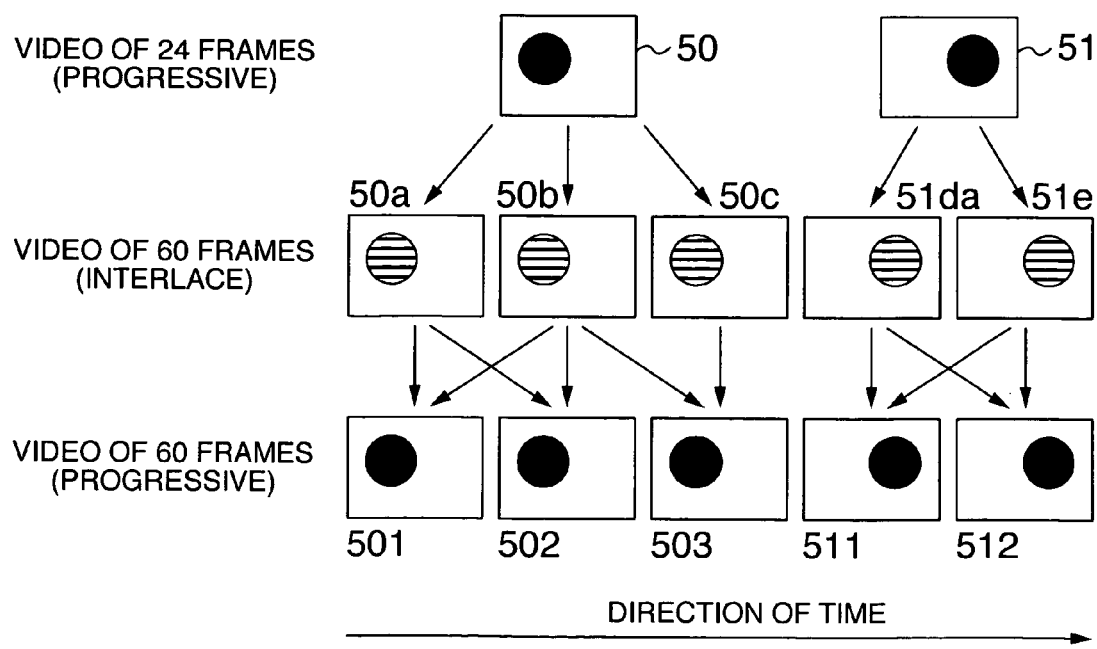
FIG. 8 is a diagram showing an example of a table structure for determining the amount of noise reduction and the amount of contour correction.
FIG. 9 is a diagram showing an example of image data processed according to a 2-3 pull-down system.

This embodiment is different from the first and second embodiment in that the control circuit 11 supplies control signals to the contour correction circuit 10a and noise reduction circuit 10b and that the table to be used as shown in FIG. 8 is produced by the combination of the tables of FIGS. 4 and 6. In other words, the table of FIG. 8 specifies the association among the combination of the frame encoding information and bit rate information, the amount of noise reduction and the amount of contour correction. The amount of noise reduction and the amount of contour correction are respectively specified in five steps of 1-5.

The control circuit 11 is supplied with the additional information 25 separated by the information detection/separation circuit 2. This additional information contains the above-mentioned frame encoding information and bit rate information. The control circuit 11 selects the corresponding amount of noise reduction and amount of contour correction by using the inputted frame encoding information and bit rate information and by referring to the table of FIG. 8. If the frame encoding information and bit rate information are respectively B-picture and low bit rate, the control circuit selects "4" amount of noise reduction and "2" amount of contour correction. Then, the control circuit 11 supplies the control signal of this amount of noise reduction to the noise reduction circuit 10b, and the control signal of this amount of contour correction to the contour correction circuit 10a. Thus, it can control the amount of noise reduction in the noise reduction circuit 10b and the amount of contour correction in the contour correction circuit 10a. Even if the additional information of other combinations is supplied, the noise reduction and contour correction processing can be performed by the same operation.

Thus, according to this embodiment, for the image containing much noise (I-picture and low bit rate) the amount of noise reduction is increased and the contour correction is weakened, but for the image containing less noise (B/P picture and high bit rate) the amount of noise reduction is decreased and the contour correction is intensified. Therefore, according to this embodiment, the noise reduction processing and the contour correction can be cooperatively controlled, and as a result the noise can be suppressed so that the image can be displayed with clear contour and high quality. While the amount of noise reduction is specified in five steps in the example of FIG. 8, it is not limited to those values, but may take various values if necessary.

Embodiment 4

Figure 10:
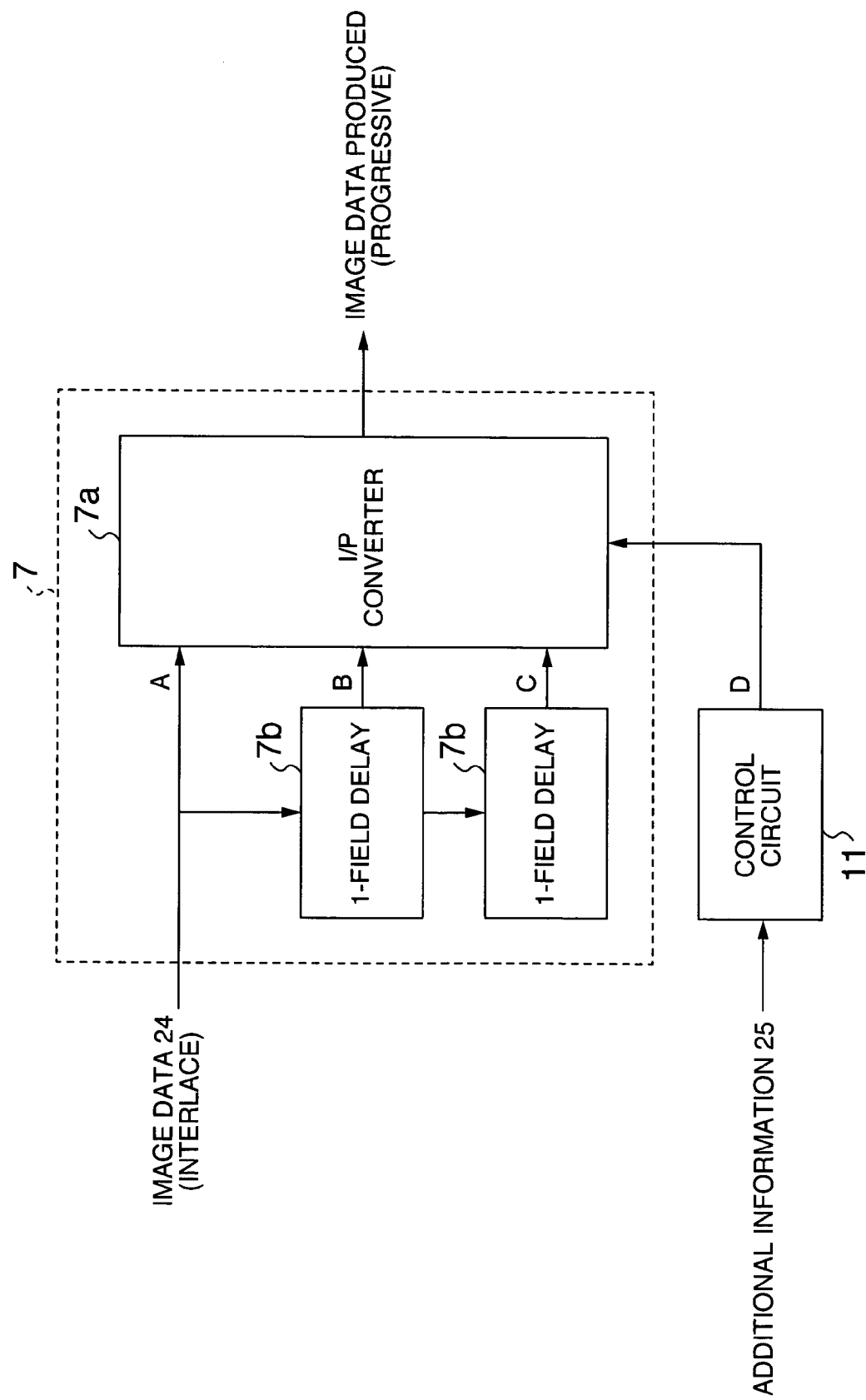
FIG. 10 is a diagram showing the fourth embodiment according to the invention.
Figure 11:
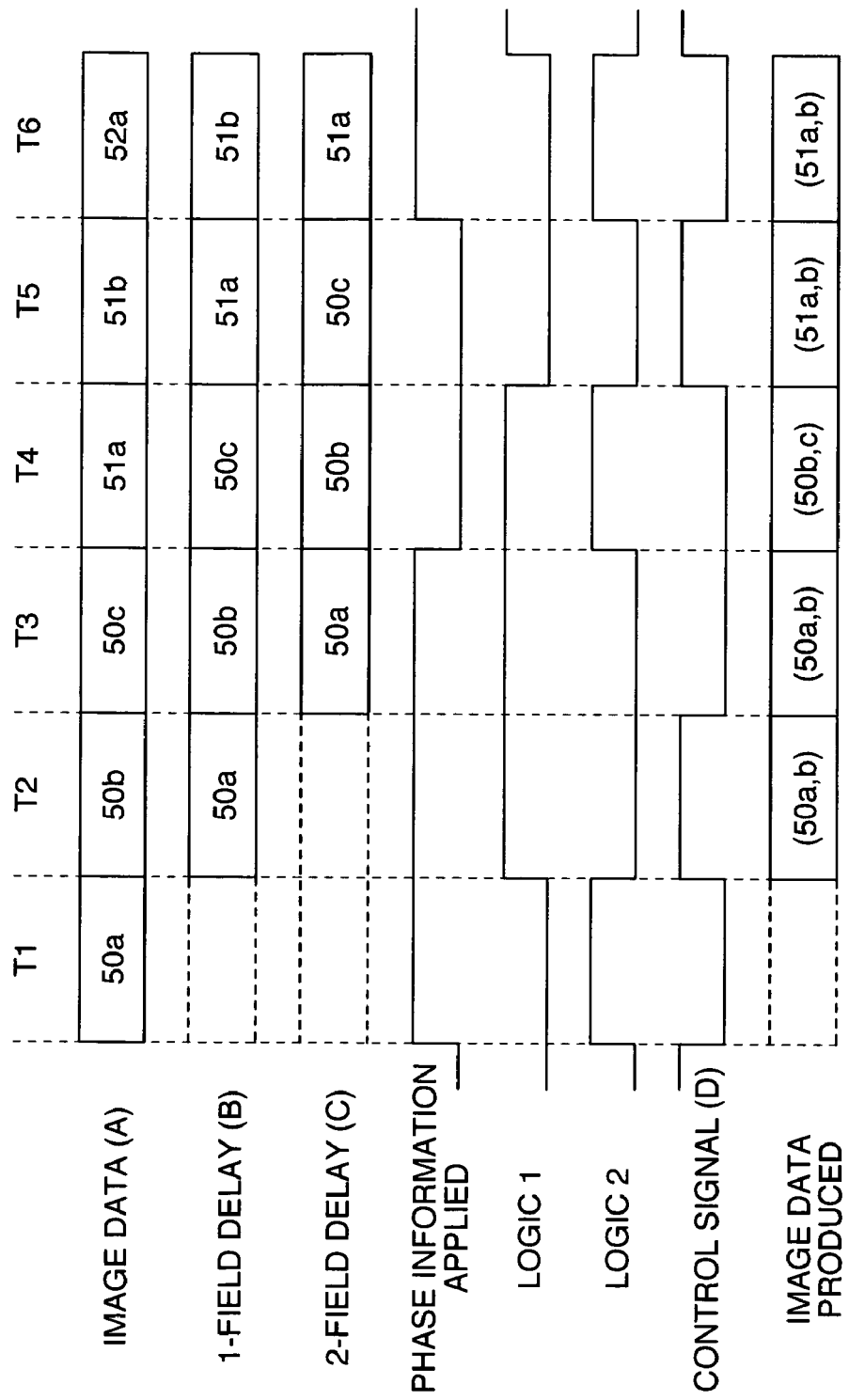
FIG. 11 is a diagram showing the operation of the fourth embodiment.

The fourth embodiment of the invention will be described with reference to FIGS. 9 through 11. While the first through third embodiments are examples of using the additional information to control the picture quality correction, this fourth embodiment controls progressive scan conversion processing by using the additional information. In other words, this embodiment uses pull-down phase information as the additional information and the control circuit 11 to control the progressive scan processing in the scan converter 7 of the image processor 3. FIG. 10 shows an example of the construction of the scan converter 7 in this embodiment. The scan converter 7 includes an I/P converter circuit 7a for converting the interlace scan image data to progressive scan image data (progressive conversion), and delay circuits 7b and 7c for delaying the image by one field. FIG. 11 shows an example of the operation. The operation of this embodiment will be described by taking an example of processing the image data of a movie source that is previously processed in a 2-3 pull-down manner.

The 2-3 pull-down processing and the progressive scan conversion for the processed data will be first described with reference to FIG. 9. The movie source is originally 24 frames per second (images 50, 51). The image displayed in the area where a television broadcast of NTSC system is received as in Japan is about 60 frames per second. Thus, a cycle of repeating the same frame (image 50) three times and the next frame (image 51) twice is periodically processed so that the frame rate is increased up to 60 frames per second (this is called the 2-3 pull-down processing). In addition, since the broadcast image is chiefly of the interlace scan type, the movies source is converted to the interlace scan type at the same time that it undergoes the pull-down processing (50a~50c, and 51d, 51e). The display apparatus that receives these images operates to produce the same image frames as before the conversion to interlace scan type. As indicated on the bottom side of FIG. 9, the images 50a and 50b, for example, are processed to convert to the progressive scan type as an image 501. Similarly, an image 502 is obtained from images 50a and 50b, an image 503 from images 50b and 50c, and images 511 and 512 from images 51d and 51e. In this way, the conversion of 60 frames to the progressive scan type is performed without mixing the images of adjacent frames of the original movie source. Thus, the resulting images can be displayed without picture quality deterioration. When the above conversion to the progressive scan type is performed, this embodiment controls the processing of converting to the progressive scan type by using the pull-down phase information (2-3 pull-down information in the example of FIG. 9) contained in the additional information 25. This processing will be described in detail with reference to FIG. 1 and FIGS. 9 through 11. Hereinafter, the image data is assumed to be of the interlace scan type. This embodiment is assumed to operate when the decoded data is of the interlace scan type.

First, referring to FIG. 1, the information detection/separation circuit 2 separates each of the decoded data 6a and 6b into image data 24 and additional information 25 that contains 2-3 pull-down phase information. The image data 24 is supplied to the scan converter 7 of the image processor 3. The image data 24 fed to the scan converter 7 is led to a point A of the I/P converter 7a and inputted thereto in the order of fields 50a, 50b, 50c . . . as shown in FIG. 11. Reference numerals 50a, 50b, 50c . . . shown in FIG. 11 represent the fields fed in turn, and correspond to those of the interlace scan type image of 60 frames per second shown in FIG. 9. The 1-field delay circuits 7b and 7c produce data shown in FIG. 11 at B and C and supply them to the I/P converter 7a, respectively. Thus, three pieces of image data, A, B and C are fed to the I/P converter 7a.

On the other hand, the additional information 25 containing the 2-3 pull-down phase information from the information detection/separation circuit 2 is supplied to the control circuit 11. This phase information, as for example, shown in FIG. 11, is assumed to reverse its signal level at point A between the period of image data 50a through 50c and the period of image data 51a through 51b. In other words, the phase information turns over in its phase between the three-field period and the two-field period of the 2-3 pull-down image information. The control circuit 11 uses this phase information to generate a control signal D shown in FIG. 11. This control signal D can be obtained by, for example, computing the exclusive logic sum (logic 2 shown in FIG. 11) of the phase information and a one-field delayed signal (logic 1 shown in FIG. 11) of this phase information and delaying it by one field. The control signal D thus produced is supplied to the I/P converter 7a. The I/P converter 7a, when the control signal D is at high level, converts image data A and B to the progressive scan type, and when the control signal D is at low level, converts image data B and C to the progressive scan type. As a result, the conversion to the progressive scan type can be made so that the images of the adjacent frames of the original movie can be prevented from being mixed as explained with reference to FIG. 9. In this embodiment, when the image data is originally of the progressive scan type, the conversion to the progressive scan type is not carried out.

Thus, since this embodiment uses the pull-down phase information to control the conversion to the progressive scan type, it is not necessary to detect the difference between the frames of the interlace scan type image in order to obtain the pull-down phase information of the image signal. Therefore, even if the image has much still portions or little signal level difference, the pull-down phase information can be substantially accurately obtained. Thus, according to this embodiment, the conversion to the progressive scan type can be performed with high precision. The levels of the signals shown in FIG. 11 are an example. Even if the high level and low level of each signal are reversed, the same operation can be achieved by reversing the operation of the progressive scan converter 7. While the image data that underwent the 2-3 pull-down process is applied to the operation of this embodiment, 2-2 pull-down or other pull-down systems may be similarly used in this embodiment.

Embodiment 5

Figure 12:
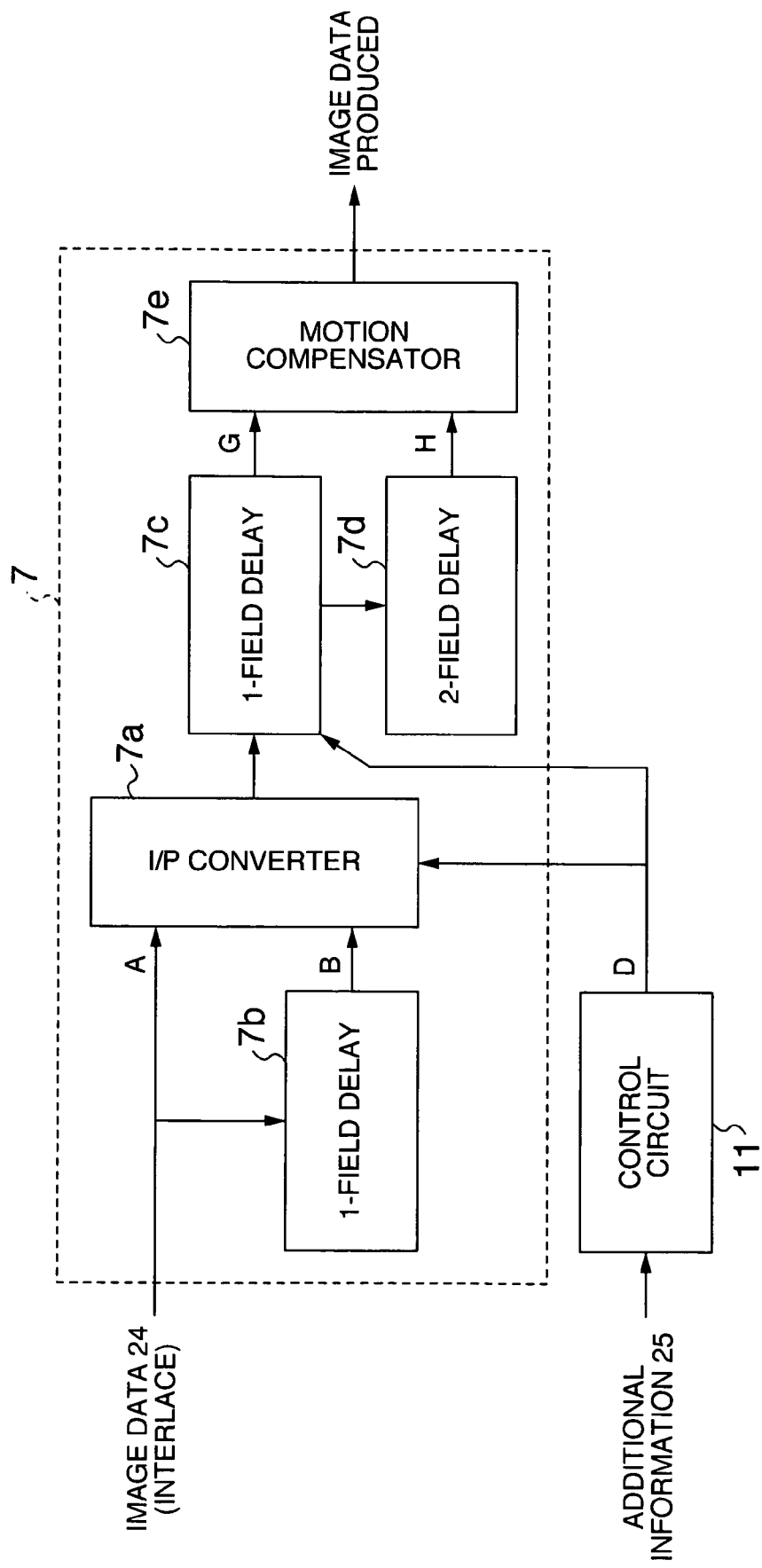
FIG. 12 is a diagram showing the fifth embodiment according to the invention.
Figure 13:
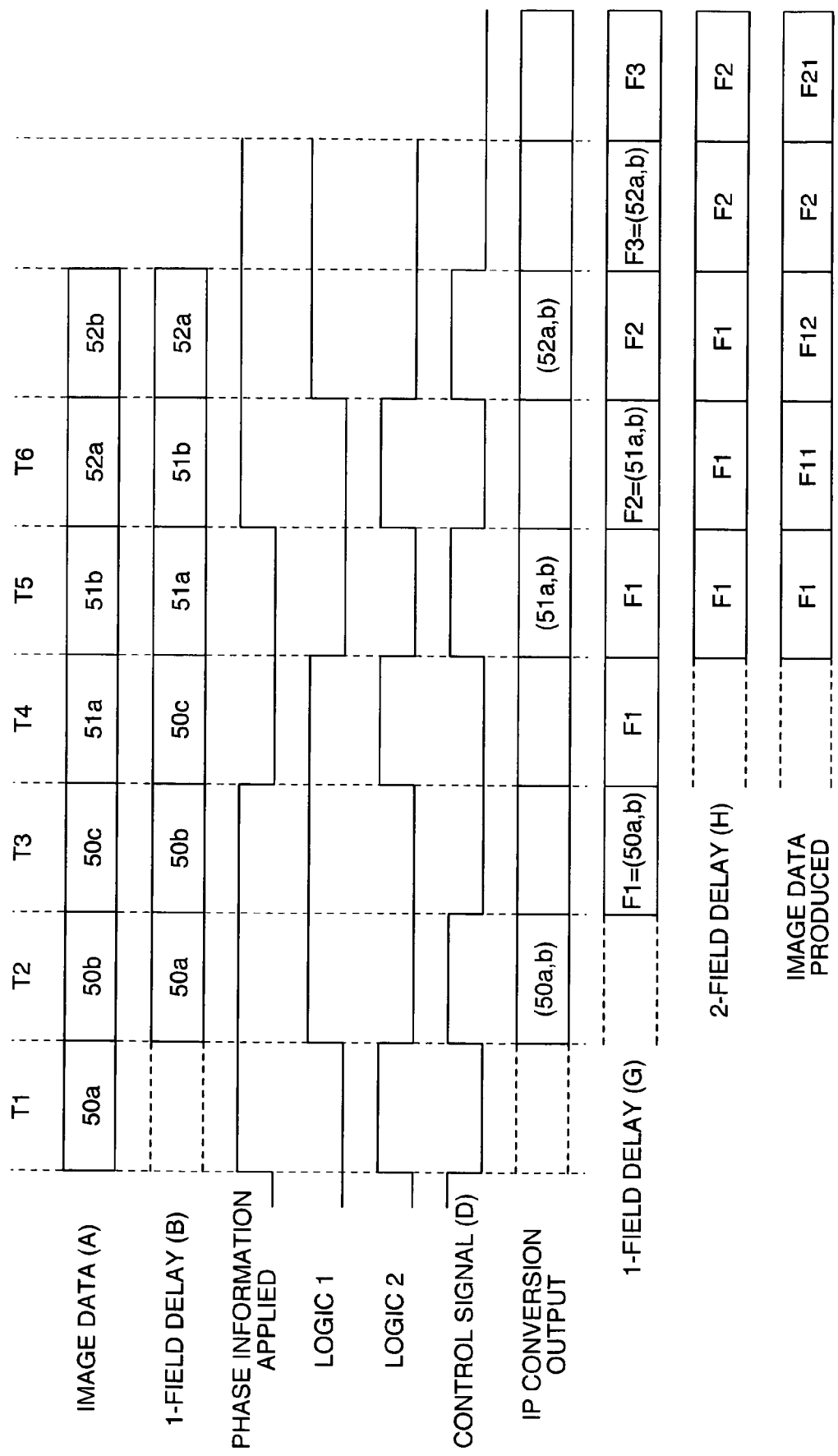
FIG. 13 is a diagram showing the operation of the fifth embodiment.
Figure 14:
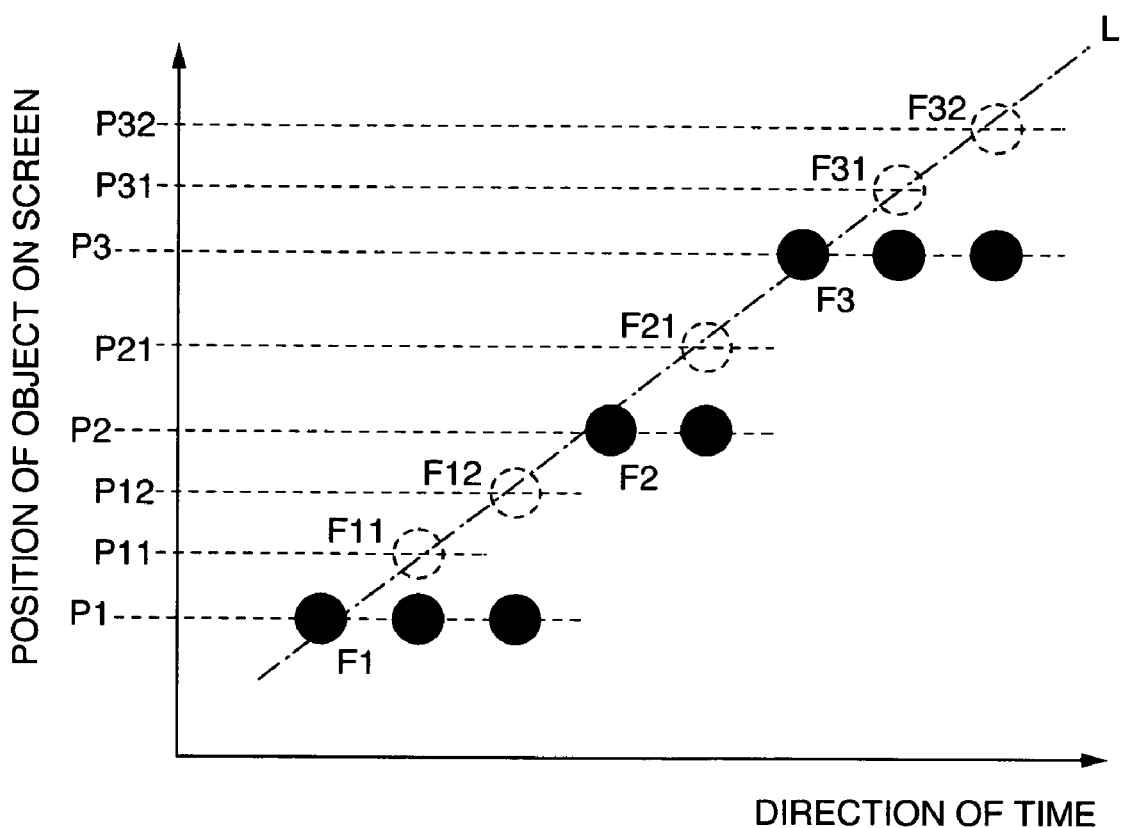
FIG. 14 is another diagram showing the operation of the fifth embodiment.

The fifth embodiment of this invention will be described with reference to FIGS. 12 through 14. In the fifth embodiment, the image that underwent the 2-3 pull-down process is converted to the progressive scan type as in the above fourth embodiment, and then subjected to a motion compensation process. FIG. 12 shows an example of the construction of the scan converter 7 according to this embodiment. The scan converter 7 according to this embodiment includes the I/P converter 7a for converting the inputted image data to the progressive scan type, the delay circuit 7b for delaying the image data 24 by one field, the delay circuit 7c for delaying the output signal from the I/P converter 7a by one field, a delay circuit 7d for delaying the output signal from the delay circuit 7c by two fields, and a motion compensator 7e for compensating for the motion of the output signals from the delay circuits 7c and 7d. FIGS. 13 and 14 show an example of the operation. The operation of this embodiment will be described with reference to FIG. 1 and FIGS. 12 through 14. In the later description, the image data is assumed to be of the interlace scan type that underwent 2-3 pull-down process as for example shown in FIG. 9. This embodiment is assumed to operate when the decoded data is of the interlace scan type.

First, referring to FIG. 1, the information detection/separation circuit 2 separates each of the decoded data 6a and 6b into the image data 24 and the additional information 25 containing the pull-down phase information. The image data 24 is supplied to the scan converter 7 of the image processor 3. The image data 24 fed to the scan converter 7 is led to the point A of I/P converter 7a shown in FIG. 12. The image data 24 is also delayed one field by the delay circuit 7b and led to a point B of the I/P converter 7a. The image data at points A and B are shown as "IMAGE DATA (A)" and "1-FIELD DELAY (B)" in FIG. 13.

On the other hand, the additional information 25 containing the pull-down phase information that is separated by the information detection/separation circuit 2 is supplied to the control circuit 11. The input signal to this control circuit is shown as "PHASE INFORMATION APPLIED" that indicates the phase at point A for the 2-3 pull-down process made on the image data. The control circuit 11 produces the control signal (D) as in the operation mentioned with reference to FIG. 9. The I/P converter 7a, when the control signal (D) is at high level, converts the image data A and B to the progressive scan type, and supplies the converted image data to the delay circuit 7c. The delay circuit 7c writes in the image data only when the control signal (D) is at high level as shown at "IP CONVERSION OUTPUT" in FIG. 13. Then, as shown in FIG. 13 at "1-FIELD DELAY (G)", the image data within the delay circuit 7c is read out every fields, and supplied to point G of motion compensator 7e and to the 2-field delay circuit 7d. The image data within the delay circuit 7c, when the image data is not written in (namely, when the control signal (D) is at low level), is repeatedly read every field. Therefore, as shown in FIG. 13 at (G), the image data of the first field F1 is delayed 1 field and read repeatedly thrice, and then the image data of the second field F2 is delayed 1 field and read repeatedly twice. The image data of the third field F3 and the following are similarly processed, or the thrice reading of same data and twice reading of next same data are periodically performed. The image data read from the delay circuit 7c is delayed 2 fields by the delay circuit 7d, and then led to a point H of the motion compensator 7e. The image data at point H is shown as "2-FIELD DELAY (H)" in FIG. 13.

The motion compensator 7e receives the output (G) from the delay circuit 7c and the output (H) from the delay circuit 7d, detects the motion vector between the two images, and compensates for the motion. FIG. 14 shows one example of the specific processing. In FIG. 14, the abscissa is time, and the ordinate is the position on the screen. F1, F2 and F3 in FIG. 14 correspond to the image data F1, F2 and F3 shown in FIG. 13, respectively. The black circles shown in FIG. 14 indicate points (objects) moving on the screen over a certain time. Before the motion compensation according to this embodiment is performed, these objects move on the screen in the order of P1, P2 and P3. In other words, the above objects are located on the screen at position P1 during the time when the field F1 is being displayed repeatedly thrice, at position P2 during the time when the field F2 is being displayed repeatedly twice, and at position P3 during the time when the field F3 is being displayed repeatedly thrice. That is, while the same field is being repeated, the objects are located at the same position. Therefore, the amount of motion of the objects between the adjacent fields becomes large, and thus the motion of objects on the screen is not visually smooth.

Thus, in this embodiment, the motion information of objects between the adjacent fields is detected and used to compensate for the motion of the image data of repeated fields, thereby making the (visual) object motion smooth. For example, the secondly appearing field of the thrice repeated fields F1 is compensated for the motion by using the motion information detected from the difference to the adjacent field F2 so that the object located at position P1 can be moved to the position P11. Thus, a new field F1 is obtained by this motion compensation. Similarly, the thirdly appearing field is compensated for the motion by using the motion information detected from the difference to the adjacent field F2 (or F1 or both) so that the object located at position P1 can be moved to the position P12 (indicated by a white circle). A new field F12 is obtained by this motion compensation. The same operation is made for the twice-repeated fields F2. For example, the secondly appearing field of the repeated fields F2 is compensated for the motion by using the motion information detected from the difference to the adjacent field F3 (or F1 or both) so that the object located at the position P2 can be moved to a position P21. A new field F21 is obtained by this motion compensation. The same operation is made for the field F3. The objects located at position P3 are moved to positions P31 and P32 by the motion compensation, and thus new fields F31 and F32 are obtained. As a result, the motion compensator 7e produces image data in the order of F1, F11, F12, F2, F21 . . . as shown in FIG. 13 at "IMAGE DATA PRODUCED". Therefore, as illustrated in FIG. 14, the motion of objects on the screen can be approximated to the one-dot chain line L that extends in the diagonal direction, and thus the amount of motion of objects between fields can be reduced. Thus, according to this embodiment, the motion of images displayed can be made smooth.

While the motion compensator 7e in this embodiment detects the motion vector for the motion compensation, the motion vector information contained in the additional information 25 can be used. In other words, it is possible that the control circuit 11 of the construction example shown in FIG. 12 is provided with a function to supply a control signal to the motion compensator 7e, and that the motion compensator 7e is provided with a function to make motion compensation on the basis of this control signal. Specifically, the motion vector information contained in the additional information 25 is supplied to the control circuit 11, and the control circuit 11 generates the control signal on the basis of this motion vector information and supplies it to the motion compensator 7e. The motion compensator 7e makes the above-mentioned motion compensation according to the motion vector information contained in the control signal fed from the control circuit 11. This construction does not need to detect the motion vector for the motion compensation. Since the motion vector is given to a block unit of 8×8 pixels in the MPEG stream, the motion compensation may be made for each unit of 8×8 pixels.

Thus, according to the embodiments of the invention, it is possible to display high-quality images. The first to sixth embodiments may be arbitrarily combined.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus comprising:
   an input unit to which a digital image signal is applied;
   a detector which detects frame encoding information that is added to each frame of said digital image signal and inputted together with said digital image signal; and
   a contour-correcting unit for correcting the contour of said digital image signal by using said frame-encoding information detected by said detector;
   wherein said detector detects as said frame encoding information an I-picture produced by intra-frame encoding of a current frame, a P-picture produced encoded by using the previous frame, or a B-picture produced encoded by using the previous frame and the next frame; and
   wherein said contour-correcting unit corrects more amount for the contour of said P-picture frame or B-picture frame detected by said detector than for the contour of said I-picture frame detected.

2. An image display apparatus according to claim 1, wherein said digital image signal is a compressed and encoded digital image signal.

3. An image display apparatus according to claim 1, wherein said digital image signal is a digital image signal compressed and encoded according to an MPEG system.

4. An image display apparatus according to claim 1, further comprising:
   a noise-reducing unit for reducing the noise of said image signal by using said frame-encoding information detected by said detector.

5. An image display apparatus comprising:
   an input unit to which a digital image signal is applied;
   a detector which detects frame encoding information added to each frame of said image signal and bit rate information of said image signal, said frame encoding information and said bit rate information being supplied together with said digital image signal; and
   a picture quality correcting unit for making picture quality correction by using said frame encoding information and said bit rate information detected by said detector;
   wherein said picture quality correcting unit includes a contour-correcting unit for making contour correction and/or a noise reducing unit for making noise reduction processing, both operations being made in accordance with a combination of said frame encoding information and said bit rate information;
   wherein said detector detects as said frame encoding information an I-picture produced by intra-frame encoding of a current frame, a P-picture produced encoded by using the previous frame or a B-picture produced encoded by using the previous frame and the next frame;

wherein said picture quality correcting unit includes a contour-correcting unit for making contour correction by using said frame encoding information and said bit rate information; and wherein said contour-correcting unit corrects more amount for said image signal that indicates the highest bit rate as said bit rate information detected by said detector, and indicates said P-picture or B-picture detected as said frame encoding information by said detector than for said image signal that indicates the lowest bit rate as said bit rate information detected by said detector and indicates said I-picture as said frame encoding information detected.

6. An image display apparatus according to claim 5, wherein said contour-correcting unit makes contour correction by using said frame encoding information and said bit rate information, and said contour-correcting unit corrects least amount for said image signal that indicates the lowest bit rate as said bit rate information detected by said detector and indicates said I-picture as said frame encoding information detected, but corrects most amount for said image signal that indicates the highest bit rate as said bit rate information detected by said detector and that indicates said P-picture or B-picture as said frame encoding information detected.

7. An image display apparatus according to claim 5, wherein said picture quality correcting unit includes a noise reducing unit for making noise reduction by using said frame encoding information and said bit rate information, and said noise reducing unit reduces more amount the noise of the image signal that indicates the lowest bit rate as said bit rate information detected by said detector and indicates said I-picture as said frame encoding information detected than the amount of contour correction for said image signal that indicates the highest bit rate as said bit rate information detected by said detector and indicates said P-picture or B-picture as said frame encoding information detected.

8. An image display apparatus according to claim 5, wherein said picture quality correcting unit includes a noise reducing unit for making noise reduction processing by using said frame encoding information and said bit rate information, and said noise reducing unit reduces the most amount the noise of said image signal that indicates the lowest bit rate as said bit rate information detected by said detector and indicates said I-picture as said frame encoding information detected, but reduces the least amount for the noise of said image signal that indicates the highest bit rate as said bit rate information detected by said detector and indicates said P-picture or B-picture as said frame encoding information detected.

* * * * *